(12) United States Patent
Cleary et al.

(10) Patent No.: US 8,346,858 B2
(45) Date of Patent: Jan. 1, 2013

(54) SYSTEM AND METHOD FOR PROVIDING AN OPTIMAL MOTIVATIONAL RESPONSE

(75) Inventors: Daniel Joseph Cleary, Schenectady, NY (US); Mark Richard Gilder, Clifton Park, NY (US); Virginia Ann Zingelewicz, Scotia, NY (US); Joseph Carl Shultz, Cambridge, MA (US)

(73) Assignee: General Electric Company, Niskayuna, NY (US)

( * ) Notice: Subject to any disclaimer, the term of this patent is extended or adjusted under 35 U.S.C. 154(b) by 129 days.

(21) Appl. No.: 12/974,597

(22) Filed: Dec. 21, 2010

(65) Prior Publication Data

US 2012/0158826 A1  Jun. 21, 2012

(51) Int. Cl.
*G06F 15/16* (2006.01)
(52) U.S. Cl. .................................. 709/203; 709/224
(58) Field of Classification Search .................. 709/203, 709/223–224
See application file for complete search history.

(56) References Cited

U.S. PATENT DOCUMENTS

| | | |
|---|---|---|
| 5,135,399 A | 8/1992 | Ryan |
| 5,596,994 A | 1/1997 | Bro |
| 6,375,470 B1 | 4/2002 | Rohan |
| 7,720,855 B2 * | 5/2010 | Brown .......................... 707/758 |
| 2007/0122780 A1 * | 5/2007 | Moon et al. .................... 434/236 |
| 2007/0219861 A1 | 9/2007 | Cummins |
| 2008/0103910 A1 | 5/2008 | Gardenswartz |
| 2009/0076842 A1 | 3/2009 | Schwarzberg et al. |
| 2009/0138342 A1 * | 5/2009 | Otto et al. ........................ 705/11 |
| 2009/0192974 A1 | 7/2009 | Worrell et al. |
| 2011/0184247 A1 * | 7/2011 | Contant et al. ................ 600/300 |
| 2011/0184742 A1 * | 7/2011 | Lynch ............................ 705/1.1 |
| 2011/0196212 A1 * | 8/2011 | Peters et al. .................. 600/300 |
| 2011/0223570 A1 * | 9/2011 | Bellontine .................... 434/236 |

FOREIGN PATENT DOCUMENTS

WO   0101303 A1   1/2001

* cited by examiner

*Primary Examiner* — Philip B Tran
(74) *Attorney, Agent, or Firm* — Jason K. Klindtworth

(57) ABSTRACT

A system for providing an optimal motivational response is provided. The system includes an input device configured to receive at least one client input from the client. The system further includes a processor configured to analyze the at least one client input received from the client and generate a current state of the client based on the at least one client input. The processor is further configured to analyze the current state of the client and determine an optimal motivational technique for the client based on the current state of the client and the at least one client input. The processor is also configured to generate an optimal motivational response based on the optimal motivational technique. The system further includes an output device configured to display the optimal motivational response to the client.

29 Claims, 7 Drawing Sheets

|  |  | Cognitive | Monetary | Affective |
|---|---|---|---|---|
| 57 | Incentives/ Loyalty points | Low | High | Low |
| 58 | Education | High  61 | Low  63 | Med |
| 59 | Socal Networking | Low | Low | High |
|  |  |  |  |  |

SYSTEM AND METHOD FOR PROVIDING AN OPTIMAL MOTIVATIONAL RESPONSE

BACKGROUND

Embodiments of the invention relate generally to motivational systems and more particularly to a system and method for providing an optimal motivational response.

Conventionally, technology has been used in various fields to motivate and align people to achieve a particular goal. One such technological area is web based technologies that have been employed to motivate a user. Some conventional web based technologies provide a method for self regulating and self adherence for the user to achieve the particular goal. Additionally, several web based technologies involve self access of an informational content and self regulated interaction with a joined community. Typically, certain conventional web based technologies are dependent on the user and lack a feedback system to adapt to the user interactions.

Furthermore, certain conventional web based technologies are impersonal, unstructured and do not provide motivational techniques based on personal behavior and requirements of the user at different times as the conventional web based technologies work on some fixed parameters resulting in an ineffective approach of motivation for the user.

Therefore, there is a need for a more effective and improved system for motivating the user.

BRIEF DESCRIPTION

In one embodiment, a system for providing an optimal motivational response is provided. The system includes an input device configured to receive at least one client input from the client. The system further includes a processor configured to analyze the at least one client input received from the client and generate a current state of the client based on the at least one client input. The processor is further configured to analyze the current state of the client and determine an optimal motivational technique for the client based on the current state of the client and the at least one client input. The processor is also configured to generate an optimal motivational response based on the optimal motivational technique. The system further includes an output device configured to display the optimal motivational response to the client.

In another embodiment, a method for providing an optimal motivational response to a client is provided. The method includes receiving at least one client input from the client from an input device. The method also includes analyzing the at least one client input received from the client and generating a current state of the client based on the at least one client input via a processor. The method further includes analyzing the current state of the client via the processor and determining an optimal motivational technique for the client based on the current state of the client and the at least one client input via the processor. The method also includes generating an optimal motivational response based on the optimal motivational technique via the processor. The method further includes displaying the optimal motivational response to the client via an output device.

In yet another embodiment, a non-transitory computer readable medium including one or more tangible media, wherein the one or more tangible media include code which when executed by one or more processors causes the one or more processors receive at least one client input from the client from an input device. The one or more processors also analyze the at least one client input received from the client and generate a current state of the client based on the at least one client input. The one or more processors further analyze the current state of the client and determine an optimal motivational technique for the client based on the current state of the client and the at least one client input. The one or more processors also generate an optimal motivational response based on the optimal motivational technique. The one or more processors further display the optimal motivational response to the client.

DRAWINGS

These and other features, aspects, and advantages of the present invention will become better understood when the following detailed description is read with reference to the accompanying drawings in which like characters represent like parts throughout the drawings, wherein.

Figure 6:
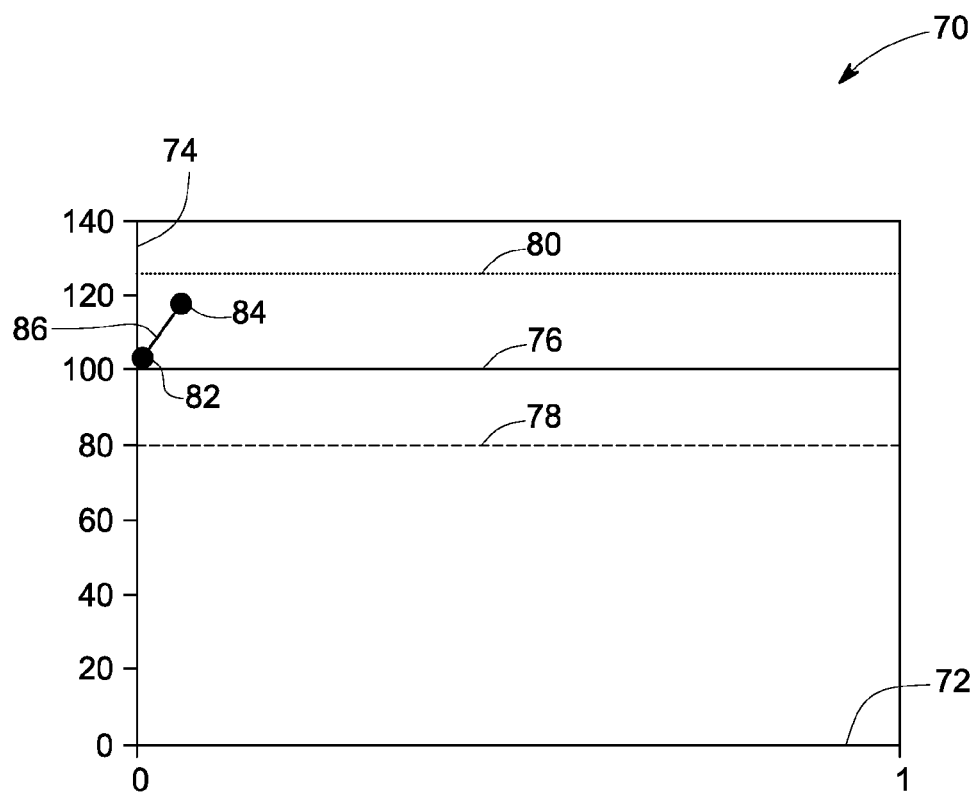
Figure 7:
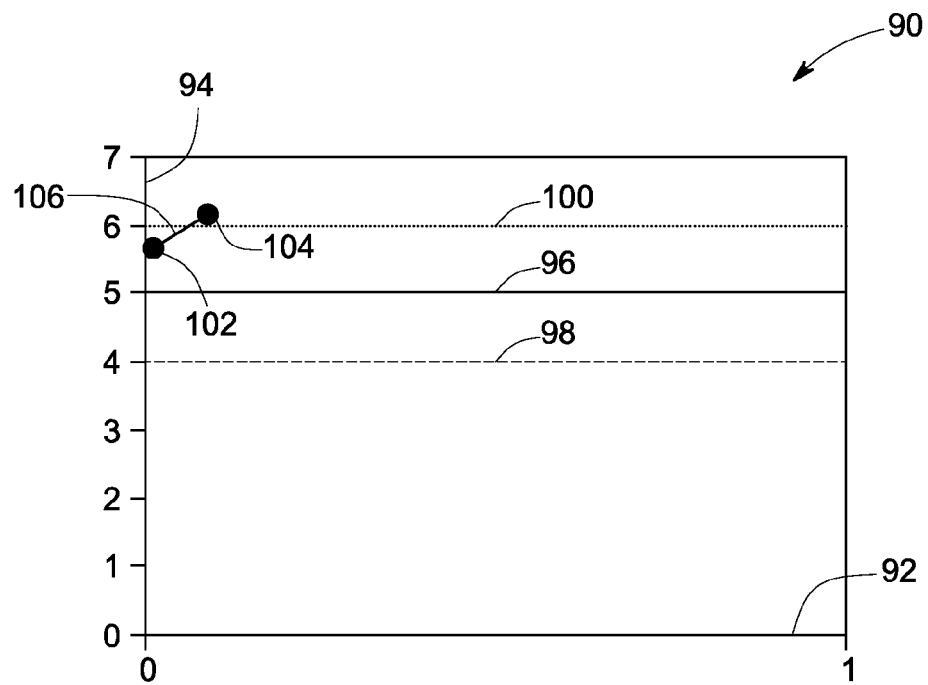

FIG. 6 is a graphical illustration of a predefined set of proxy parameters depicting an idealized weight loss model in accordance with an embodiment of the invention FIG. 7 is a graphical illustration of the predefined state depicting a personalized weight loss plan to reach a goal of 170 pounds generated by the processor after analyzing the idealized weight loss model and the at least one input provided by the client in accordance with an embodiment of the invention.

Figure 8:
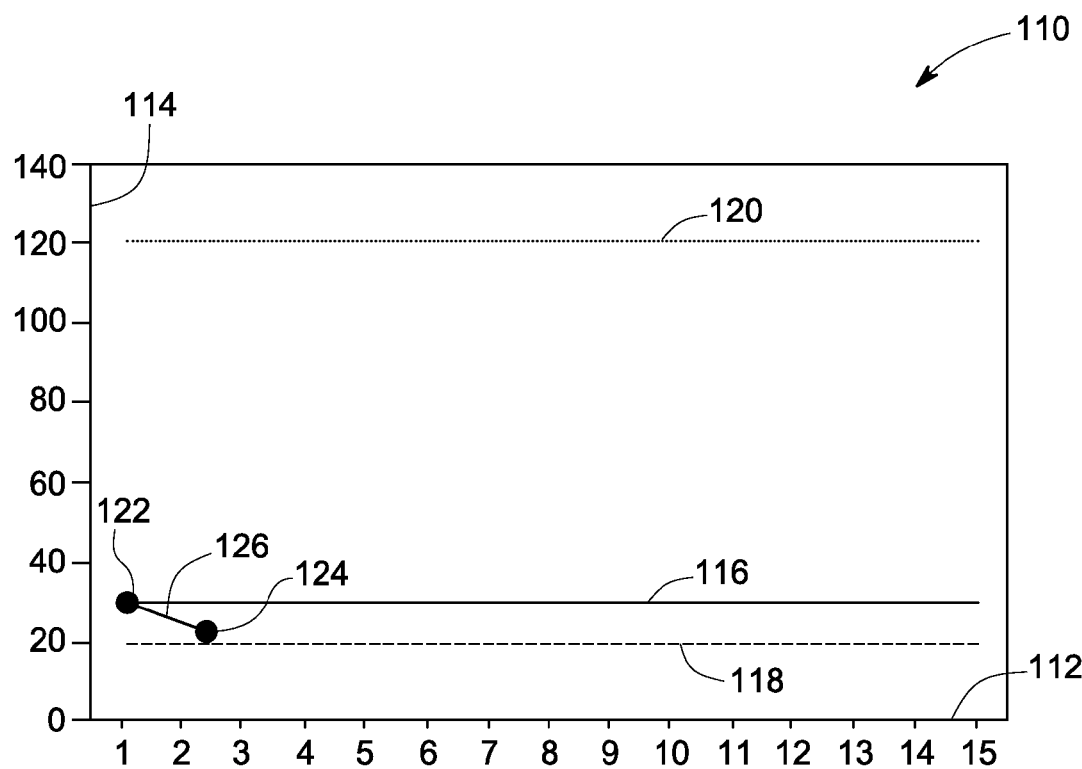

FIG. 8 is a graphical representation of a client progress on the personalized weight loss plan depicting multiple current states and multiple motivational responses generated based on the multiple current states in accordance with an embodiment of the invention.

Figure 9:
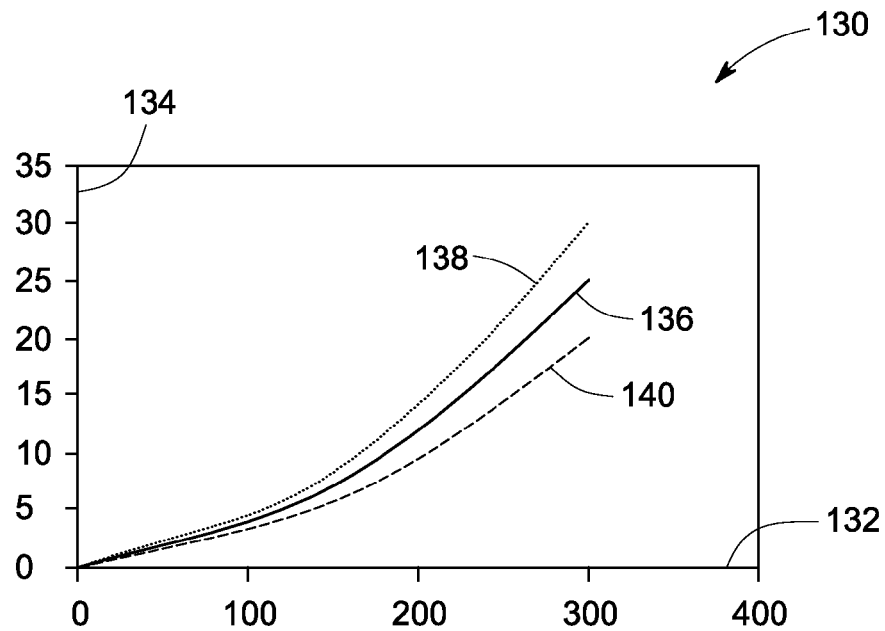

FIG. 9 is a graphical representation of a blood sugar level in a human body depicting a first current state and a second current state of the blood glucose level for the client to generate a second measured current state in accordance with an embodiment of the invention.

Figure 10:
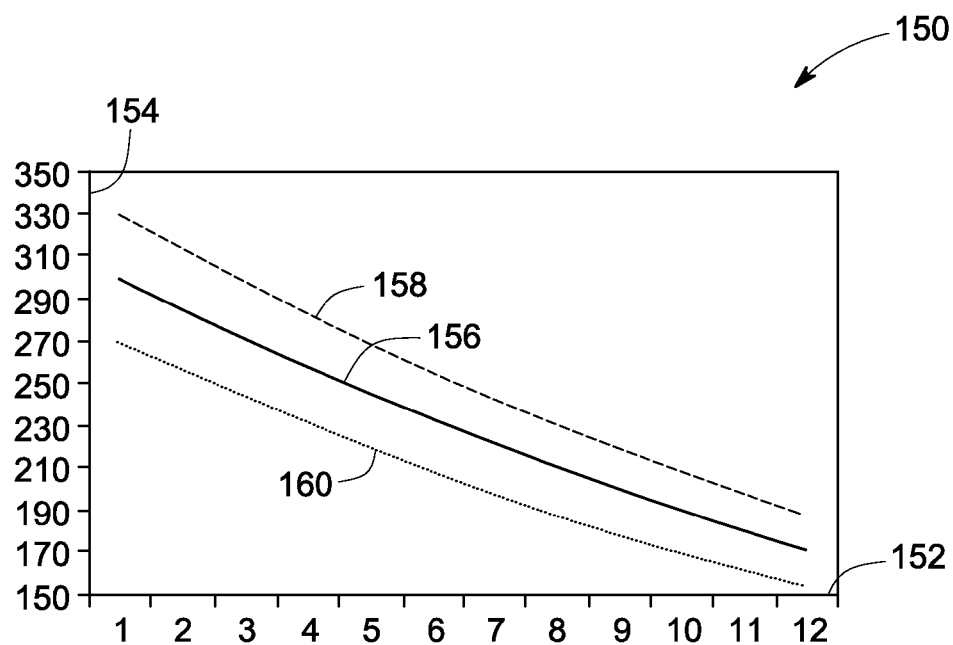

FIG. 10 is a graphical representation of a glycated hemoglobin level in the blood of a human body depicting a first and a second current state of the glycated hemoglobin level for the client to generate the second measured current state in accordance with an embodiment of the invention.

Figure 11:
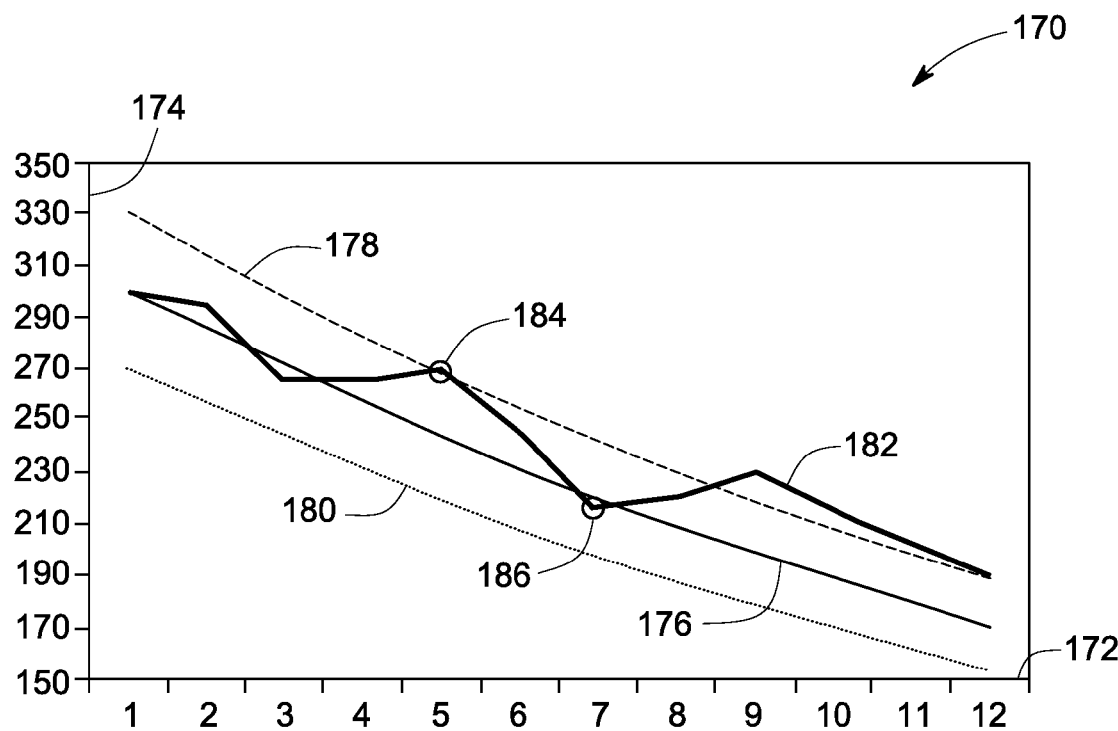

FIG. 11 is a graphical representation of an exercise activity for a diabetes patient depicting a first and a second current state of the exercise activity for the client to generate the second measured current state in accordance with an embodiment of the invention.

Figure 12:
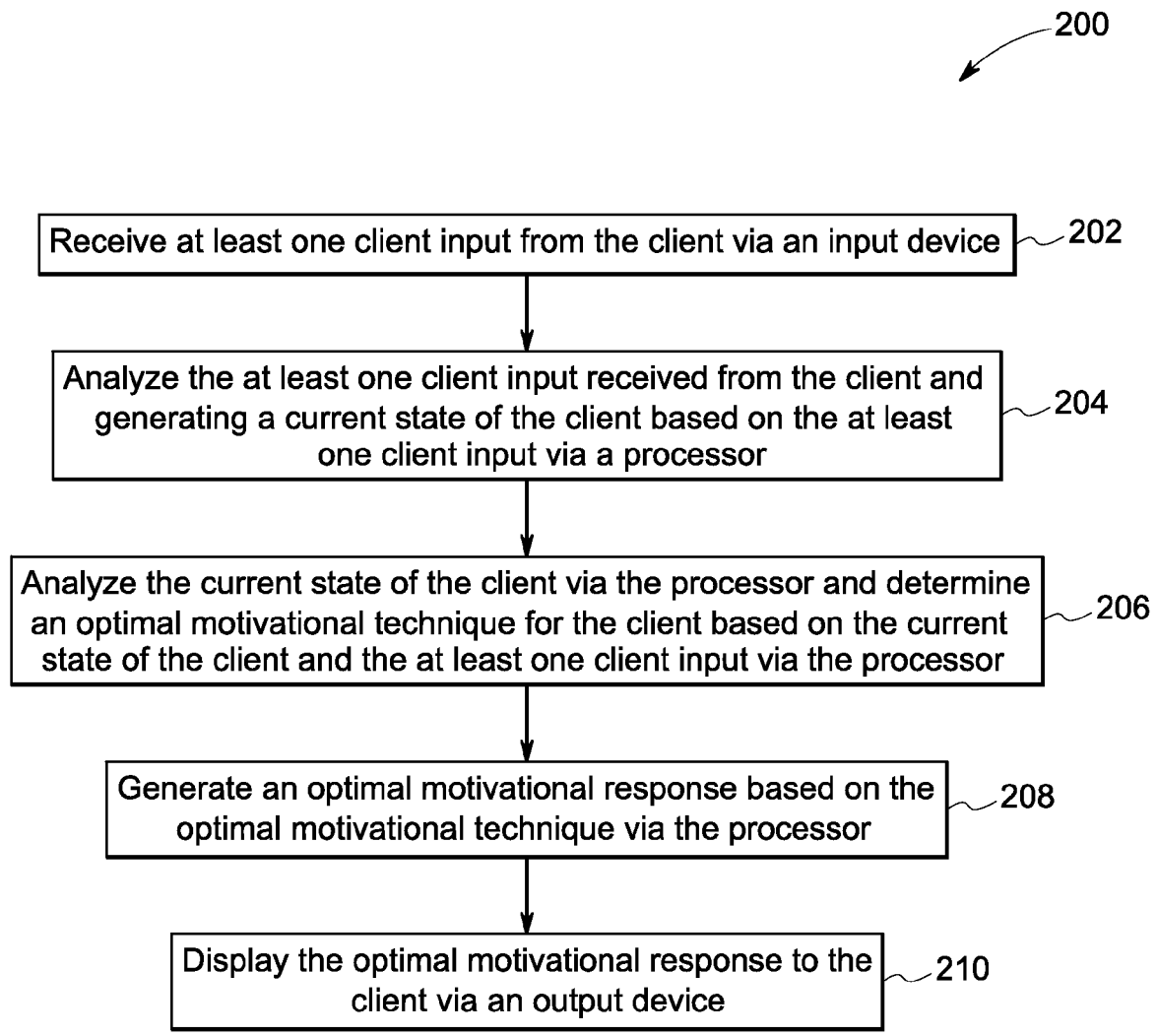

FIG. 12 is a flow chart representing the steps involved in the method 200 for providing an optimal motivational response to a client in accordance with an embodiment of the invention.

DETAILED DESCRIPTION

Embodiments of the present invention include a system and method for providing an optimal motivational response to a client. The system includes an input device that receives input from the client. In the embodiments discussed herein below, the client is a person or a human being capable of entering the client input via the input device. The client input is transmitted to a processor that analyzes the client input and generates a current state of the client based on the client input. Furthermore, the processor analyzes the current state of the client and determines an optimal motivational technique for the client based on the current state of the client and the client input. Consequently, the processor generates an optimal motivational response based on the optimal motivational technique. The processor transmits the optimal motivational response to an output device that displays the optimal motivational response to the client. The system will be described in greater detail with respect to FIG. 1 below.

Figure 1:
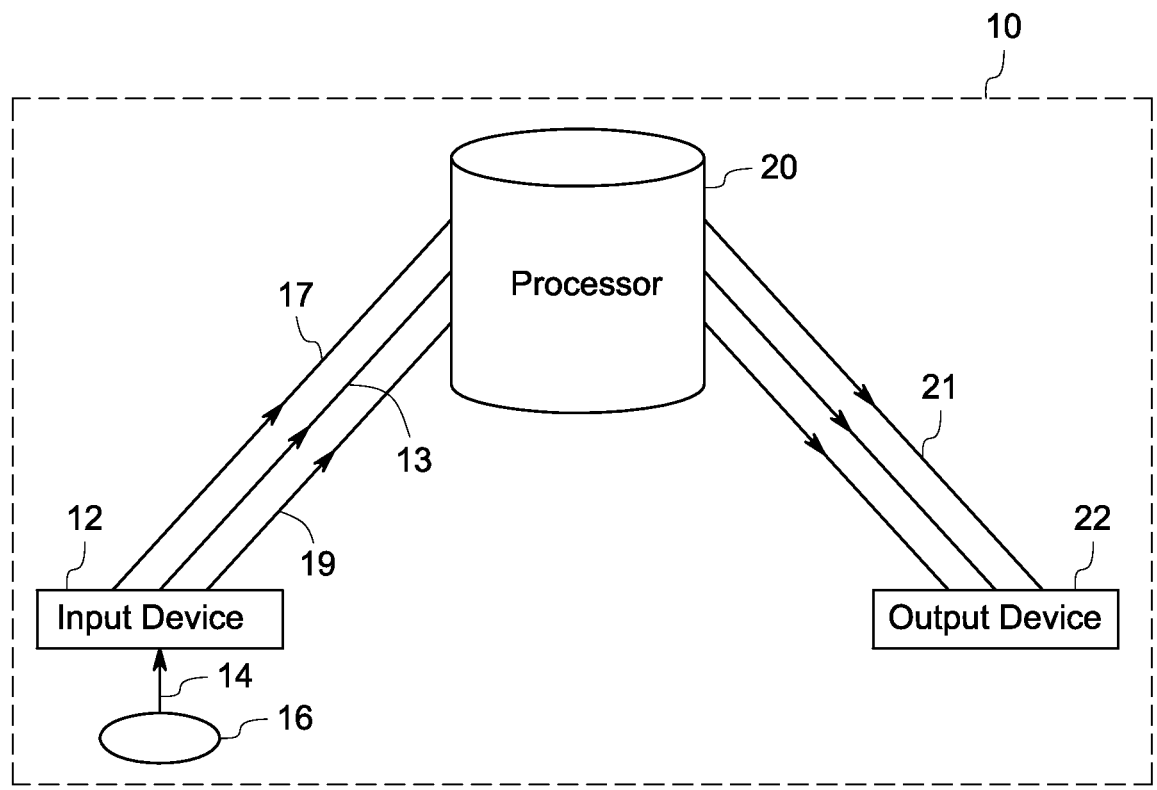
FIG. 1 is a schematic representation of a system for providing an optimal motivational response in accordance with an embodiment of the invention.

FIG. 1 is a schematic representation of a system 10 for providing an optimal motivational response in accordance with an embodiment of the invention. The system 10 includes an input device 12 that receives a client input 14 from a client 16. In one embodiment, the input device 12 may include any device employed to input data into a computer system. In one embodiment, the client input 14 may include a predefined state 17, values 13 for a predefined set of proxy parameters 18 based on the predefined state 17 and an initial motivational profile information 19. The input device 12 transmits the client input 14 to a processor 20. In an exemplary embodiment, the input device 12 transmits the client input 14 via a network to the processor 20. In an exemplary embodiment, the network may include an Internet connection. For simplicity of understanding the invention, the description would be discussed with respect to an example for controlling a disease. However, the example would not in any way restrict the application of the system in any other situation.

For example, the system 10 may be employed for a disease control wherein the client 16 may be a patient and the disease may be diabetes for example. The patient may insert the client input 14 in a computer system via the input device 12 such as a keyboard. The client input 14 includes the predefined state 17 such as diabetes. The client input 14 further includes values 13 for the predefined set of proxy parameters 18 such as a blood glucose level, a glycated hemoglobin level and an exercise activity. Furthermore, the client input 14 includes an initial motivational profile information 19 that may include fields such as age, family status, patient's interest areas and answers to a predefined set of questions generated by the system 10. In a particular embodiment, the system 10 may be communicatively coupled to an electronic medical record database via a network such as the Internet. In another embodiment, the system 10 may extract an initial motivational profile 19 and a first current state from the electronic medical report database. In one embodiment, the first current state includes a current state of health of the client based on the values 13 of the predefined set of proxy parameters. The client input 14 is transferred to the processor 20 via the network connection for further processing.

The processor 20 receives the client input 14 and analyzes the input 14 to generate a current state of the client 16 based on the client input 14. Furthermore, the processor 20 analyzes the current state and determines an optimal motivational technique to motivate the client 16. In one embodiment the optimal motivational technique includes a first optimal motivational technique and a second optimal motivational technique. The first optimal motivational technique 15 for the client 16 may be generated based on the first current state of the client 16 and the client input 14. In a particular embodiment, the first optimal motivational technique 15 may include at least one of a cognitive, an affective or a monetary technique. The processor 20 generates a first optimal motivational response 21 based on the first optimal motivational technique 15. The first optimal motivational response 21 may be transmitted to an output device 22 via the network. In one embodiment, the output device 22 may include a computer system display or a cell phone display or any other display device capable of communicating with the processor. The output device 22 receives the first optimal motivational response 21 from the processor 20 and displays the first optimal motivational response 21 to the client 16.

Figure 2:
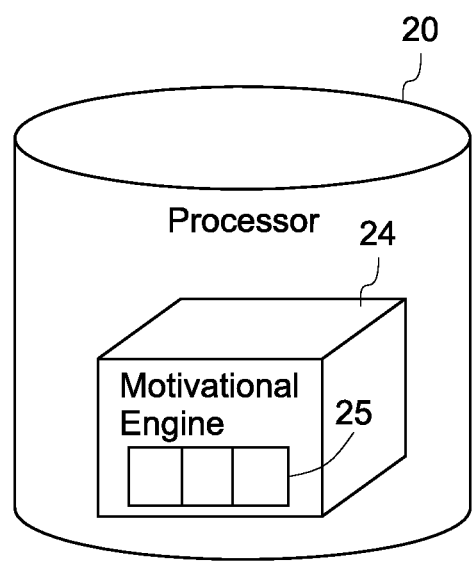
FIG. 2 is a schematic representation of the processor of FIG. 1 including a motivational engine in accordance with an embodiment of the invention.

FIG. 2 is a schematic representation of the processor 20 of FIG. 1 including a motivational engine 24 in accordance with an embodiment of the invention. The processor 20 includes the motivational engine 24 that analyzes the current state of the client 16 and determines the first optimal motivational technique and the second optimal motivational technique for the client 16 based on the current state and the client input 14. In one embodiment, the motivational engine 24 may include a plurality of motivational filters 25 that determine a frequency of notification of the first motivational response and a format of the content of the first motivational response based on the client interest area. In a non-limiting example, the notification frequency may include reminders, alerts and an event driven notification process. The content format may include videos, scientific articles, and mobile phone based reading materials, for example. In another non-limiting example, the client interest area may include topics of interest specified by the client 16. Furthermore, the plurality of motivational filters 25 may be generally provided by the client 16 as a part of the initial motivational profile information 19. The motivational engine 24 will be better understood with respect to FIG. 3 described below.

Figure 3:
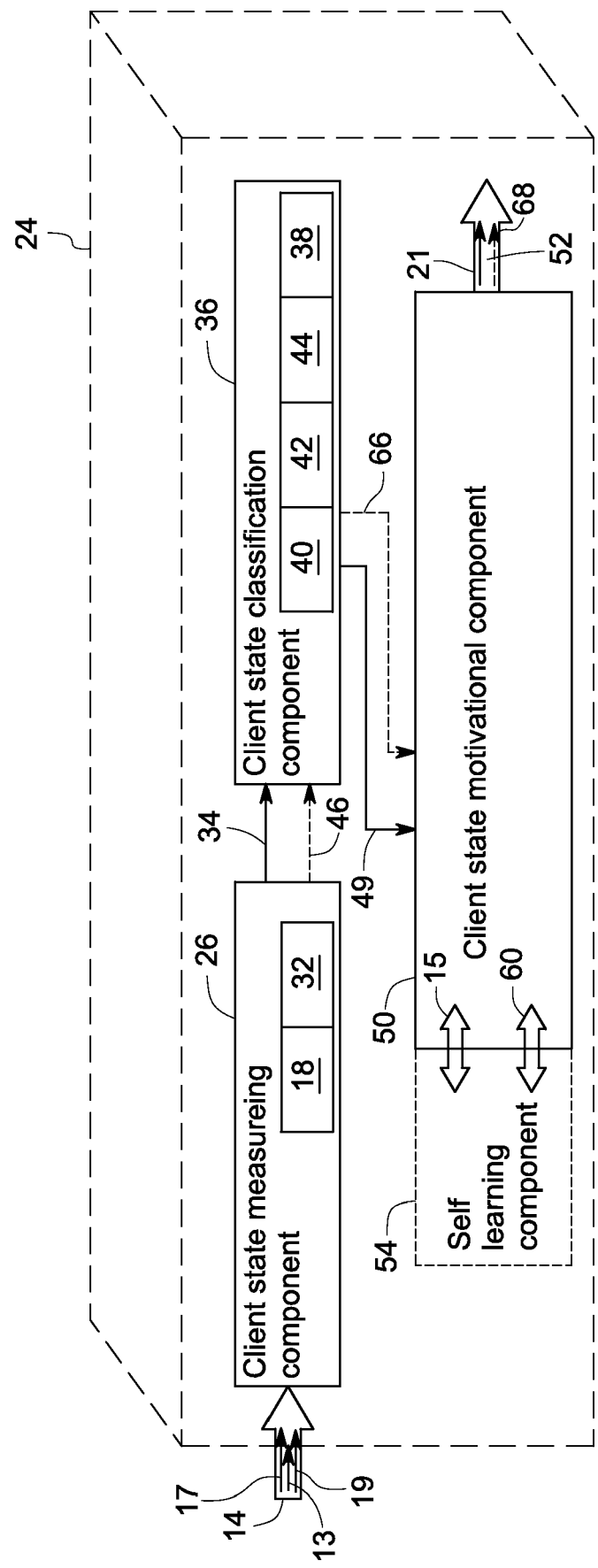
FIG. 3 is a schematic representation of the motivational engine of FIG. 2 configured to determine the optimal motivational technique for the client 16 in accordance with an embodiment of the invention.

FIG. 3 is a schematic representation of the motivational engine 24 of FIG. 2 configured to determine the first optimal motivational technique 15 for the client 16 in accordance with an embodiment of the invention. The motivational engine 24 includes a client state measuring component 26 that measures a first current state and a second current state of the client 16. In an exemplary embodiment, the first current state is represented by the values 13 of the set of proxy parameters 18 provided by the client 16 at one instance of time. In another exemplary embodiment, the second current state is represented by the values 13 of the set of proxy parameters 18 provided by the client 16 successively after an interval of time. In yet another exemplary embodiment, the first current state is considered as a previous current state with respect to the second current state. The client state measuring component 26 receives the client input 14 from the client 16. The client input 14 may include the predefined state 17 provided by the client 16. In an exemplary embodiment, the predefined state 17 may include multiple predefined states. The client state measuring component 26 includes the predefined set of proxy parameters 18 for each of the multiple predefined states. In one embodiment, the predefined set of proxy parameters 18 refer to a generally accepted set of standard parameters used to track a particular predefined state. In another embodiment, each of the proxy parameters in the predefined set of proxy parameters 18 is associated with values within a generally accepted range with an acceptable level of variance.

The client 16 further provides the values 13 for each of the proxy parameter in the predefined set of proxy parameters 18.

Referring again to the example of diabetes control described in FIG. 1, in accordance with an embodiment of the present invention, the client state measuring component 26 receives the predefined state 17 such as diabetes. In a particular embodiment, the client state measuring component 26 includes the predefined set of proxy parameters 18 for diabetes such as the blood glucose, glycated hemoglobin and the exercise activity. The client state measuring component 26 requests the patient to provide the values 13 for the predefined set of proxy parameters 18 such as current blood glucose level, glycated hemoglobin level and minutes for which the patient does exercise activity everyday.

The client state measuring component 26 receives the values 13 for each of the proxy parameters in the predefined set of proxy parameters 18 and generates a product of each of the proxy parameter by multiplying the values 13 of each of the proxy parameter with a predefined weighing factor 32 of each of the corresponding proxy parameter. Furthermore, the client state measuring component 26 aggregates the product of each of the proxy parameters to generate a first measured current state 34 of the client. The first measured current state 34 may be further defined by: $(D_i, M_1 \times W_1 + M_2 \times W_2 + \ldots M_n \times W_n, C_j)$ wherein D represents the predefined state, (M1, M2, ... Mn) represents a difference between the values 13 for the proxy parameters in the set of predefined proxy parameters 18 provided at one instance of time and the values 13 for the proxy parameters in the set of predefined proxy parameters 18 in a previous current state for the predefined state D. W1, W2, ... Wn represents the predefined weighing factors 32 for the proxy parameters (M1, M2, ... Mn) respectively and Cj represents a motivational effectiveness for the client 16. The motivational effectiveness for measuring the first current state may be considered zero. However, for measuring subsequent current states the motivational effectiveness may be calculated from the effectiveness of a previous motivational response.

Figures 4, 5:
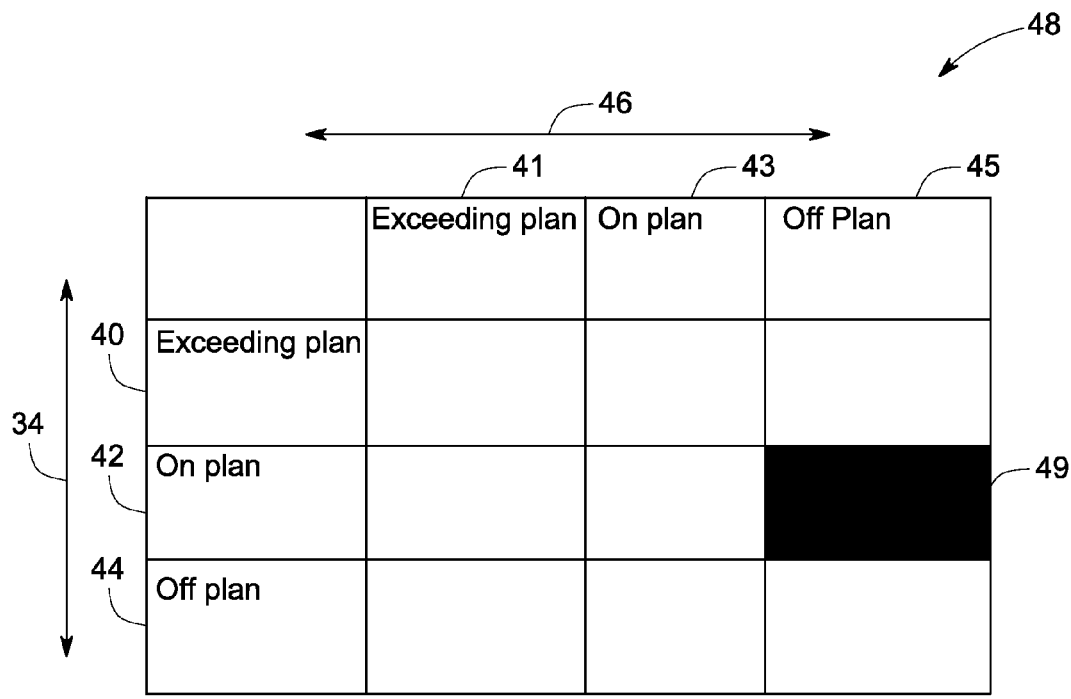
FIG. 4 is schematic representation of a Y response matrix depicting an example of the comparison of a first measured current state and a second measured current state representative of a predefined class in accordance with an embodiment of the invention.
FIG. 5 is a schematic representation of an example of an X space model depicting multiple motivational theories with respect to multiple motivational techniques provided to motivate the client in accordance with an embodiment of the invention.

Again, referring to the same example of diabetes control, in accordance with an embodiment of the present invention, the patient provides the values 13 of 100 milligrams/deciliter of blood for blood glucose level, 5.5% in blood for glycated hemoglobin and 30 minutes of exercise activity per day for example. The values 13 provided by the patient are representative of the first current state. The first current state is compared with the values of a previous state of the client and a difference is aggregated by the client state measuring component 26. Particularly, for generating the first measured current state 34, standardized normal values of the proxy parameters 18 are considered as the previous state. The client state measuring component 26 multiplies the difference between the first current state and the previous state with the standard predefined weighing factors 32 of the proxy parameters 18 for the predefined state 17 such as 0.9, 1.0 and 0.5 for the blood glucose level, the glycated hemoglobin and the exercise activity respectively. In the particular example, the difference values for the first current state include 0, minus(−) 0.5 and 0 for the blood glucose level, the glycated hemoglobin and the exercise activity, respectively. The glycated hemoglobin is provided as a negative value, as the normal value of the glycated hemoglobin is 5%. Further, the product of the proxy parameters 18 results in 0, 0.5 and 0 for the blood glucose level, the glycated hemoglobin and the exercise activity, respectively. The products of the proxy parameters 18 are added to provide a sum such as minus(−) 0.5. The sum of the products is normalized further by doubling the sum to generate the first measured current state 34. The first measured current state 34 may be depicted as (1, minus(−) 0.25, 0). The motivational effectiveness for the first measured current state is considered zero, as there is no previous state. The client's overall progress towards a desired goal can be measured and normalized in various ways, including for example any of the (possibly weighted) Pythagorean means. The goal is to supply a scalable first measured current state 34 and the second measured current state to the client state classification component 36 in FIG. 3 as nominally described herein, which can then be classified as depicted in FIG. 4.

The steps described above may be repeated to generate the second measured current state 46, wherein the patient provides the values 13 of 120 milligrams per deciliter for blood glucose level, 6.3% in blood for glycated hemoglobin and 20 minutes of exercise activity representative of the second current state. For example, the values 13 provided by the patient are compared with the values of the first current state to generate a difference represented in a percentage of change. The difference between the first current state and the second current state is represented as minus(−) 0.2, minus(−) 0.8 and minus(−) 0.1 for the blood glucose level, the glycated hemoglobin and the exercise activity minutes respectively. The difference is assigned negative values as the condition of the patient has deteriorated from the first current state based on the normal levels of the proxy parameters 18. The client state measuring component 26 multiplies the difference by the standard predefined weighing factors 32 of the proxy parameters 18 for the predefined state 17 such as 0.9, 1.0 and 0.5 for the blood glucose level, the glycated hemoglobin and the exercise activity, respectively. Further, the product of the proxy parameters 18 results in minus(−) 0.18, 0.8 and minus (−) 0.05 for the blood glucose level, the glycated hemoglobin and the exercise activity, respectively. The products of the proxy parameters 18 are added to provide a sum of minus(−) 1.03. The sum is further normalized to provide the second measured current state 46 including a value minus(−) 2.06. The values described herein above and below are exemplary values and should not be construed in any way as limiting the scope of the invention.

The client state measuring component 26 transmits the first measured current state 34 to a client state classification component 36. The client state classification component 36 includes multiple predefined classes 38 representative of a measured current state. In one embodiment, the predefined class 38 may include a first class 40, a second class 42 and a third class 44. However, the predefined classes 38 are not limited to three classes and may include a desired number of multiple classes. In another embodiment, the first predefined class 40, the second predefined class 42 and the third predefined class 44 may include the first measured current state 34 and a second measured current state 46 representative of a first predefined threshold range, second threshold range, and a third threshold range, respectively. The client state classification component 36 classifies the first measured current state 34 and the second measured current state 46 into one or more predefined classes 38.

The first measured current state 34 may be classified within the predefined class 38 based on a value of the first measured current state 34. Furthermore, the second measured current state 46 and the subsequent measured current states are classified by comparing a previous measured current state with a present measured current state. For example, the second measured current state 46 may be classified based on the comparison of the values of the first measured current state 34 and the second measured current state 46.

Again, referring to the same example discussed above, in accordance with an embodiment of the present invention, the first measured current state 34 is transmitted to the client state classification component 36. The client state classification component 36 includes the first predefined class 40, the second predefined class 42 and the third predefined class 44 such as "exceeding plan", "on plan" and "off plan" respectively. The "exceeding plan" class depicts that the patient is performing better than expected in controlling the diabetes. The "on plan" class depicts that the patient is performing as expected in controlling the diabetes. The "off plan" class depicts that the patient is deteriorating and is under performing from the expected behavior in controlling diabetes. The first predefined class 40 includes first threshold values >0.05, the second predefined class 42 includes second threshold values 0.05 to minus(−) 0.05 and the third predefined class 44 includes third threshold values of <minus(−) 0.05, for example. The first measured current state 34 and the second measured current state 46 are classified between the exceeding plan predefined class, the on plan predefined class and the off plan predefined class. The client state classification component 36 classifies the first measured current state 34 and the second measured current state 46 representative of a Y response matrix. The client state classification component 36 generates the Y response matrix and analyzes the Y response matrix to determine a classified current state 49 of the client 16 such as the patient. The Y response matrix is explained in detail below for clarity with reference to FIG. 4. The remaining description of FIG. 3 is explained in greater details after description of FIG. 4.

FIG. 4 is an example of the Y response matrix 48 representative of the comparison analyzed by the client state classification component 36 for the disease control example explained in detail herein in conjunction with FIG. 3 in accordance with an embodiment of the present invention. The Y response matrix 48 includes a vertical axis depicting the first predefined class 40, the second predefined class 42 and the third predefined class 44 such as exceeding plan, on plan and off plan respectively for the first measured current state 34. The Y response matrix includes a horizontal axis depicting the first predefined class 41, the second predefined class 43 and the third predefined class 45 for the second measured current state 46. Examples of the first predefined class 41, the second predefined class 43 and the third predefined class 45 may include exceeding plan, on plan and off plan respectively. In one embodiment, a new Y response matrix is generated for each comparison between a present and a previous measured current state. As observed from the matrix 48, the first measured current state 34 of the client 16 may be a value representative of the "on plan" second predefined class 42 as the first measured current state (represented by the value −0.05) is representative of the value within the threshold values of the "on plan" second predefined class. However, a value of the second measured current state 46 (represented by the value −2.03) may be a value representative of the "Off plan" third predefined class 45 based on the predefined class threshold values described above. Therefore, the shaded region in the matrix 48 represents the classified current state 49. The classified current state 49 depicts that the patient has deteriorated as the patient has transitioned from "on plan" predefined class in the first measured current 34 state to the "off plan" predefined class in the second measured current state 46. Subsequently, a first optimal motivational technique is identified based on the classified current state 49 to motivate the client to control the diabetes. The first optimal motivational technique may be identified by a client state motivational component 50 as described with respect to FIG. 3.

Referring again to FIG. 3, the client state motivational component 50 identifies the first optimal motivational technique 15 to motivate the client based on the classified current state 49 and generates a first motivational response 52 corresponding to the first optimal motivational technique 15. The client state motivational component 50 includes a self learning component 54 that analyzes the classified current state 49 to determine the first optimal motivational technique 15. The self learning component 54 identifies the first optimal motivational technique 15 for the classified current state 49 either on a random basis or based on certain predefined conditions. Such conditions may be generated based on the initial motivational profile information or group clustering. As illustrated herein, group clustering may be defined as forming a group of individuals including similar initial motivational profiles. Similarly, the self-learning component 54 identifies a second optimal motivational technique 60 for the second measured current state 46 based on the classified current state 49. The self-learning component 54 calculates a probability of the client 16 to transition from one classified current state to another by comparing the values of the measured current state with the values of the threshold range of the predefined classes 38.

As described above in the disease control example, in accordance with an embodiment of the present invention, the Y response matrix 48 represents that the first measured current state is within the "on plan" class (minus(−) 0.05 to 0.05) but is on a lower side (minus(−) 0.05) of the threshold values representative of deterioration in the current state of the patient. The self-learning component 54 identifies the first optimal motivational technique 15 to improve the first measured current state 34 of the client 16.

Furthermore, if the Y response matrix 48 represents that the second measured current state 46 is within the "off plan" class, the self learning component 54 derives a conclusion that the first optimal motivation technique 15 is not effective since the current state of the client has further deteriorated and may identify the second optimal motivational technique 60 to improve the current state of the client 16.

Similarly, for example, if the Y response matrix 48 represents that the first measured current state 34 is within the "on plan" class and at an upper level of the threshold range, the self learning component 54 may identify the first optimal motivational technique 15 to motivate the patient to transition to the "exceeding plan" class. Furthermore, if the second measured current state 46 is representative of the "exceeding plan" class, the self-learning component 54 may conclude that the first motivational technique is effective and will continue with the same first optimal motivational technique 15.

Furthermore, the self learning component 54 also determines the frequency of notification to the client 16 and the format of the content to be sent to the client 16 based on the analysis of the Y response matrix 48 and the plurality of filters 25 including client interest areas provided by the client 16 in the initial profile information 19.

The first optimal motivational technique 15 provided by the self-learning component 54 is based on various motivational theories. The motivational theories are analyzed to form multiple motivational techniques. The multiple motivational theories are mapped with the multiple motivational techniques in an "X space model" 56 to identify the first optimal motivational technique 15 for the client discussed in greater detail with reference to FIG. 5.

Referring to FIG. 5, an X space model 56 used to map the motivational theories with the multiple motivational techniques to identify the optimal motivational technique 15 for the client is disclosed in accordance with an embodiment of the invention. In a non-limiting example, the motivational theories may include a cognitive theory 51, a monetary theory 53 and an affective theory 55. As illustrated herein, the cognitive theory 51 may include any technique that may appeal to the intellect of the client 16. The monetary theory 53 may be defined as a theory that may include any technique that may appeal to the client 16 on any immediate monetary gain. Further, the affective theory 55 may include any technique that may appeal to the emotions or social relationships of the client 16. The X space model 56 also includes a horizontal axis depicting multiple motivational techniques such as the cognitive theory 51, the monetary theory 53 and affective theory 55. The X space model 56 includes a vertical axis depicting multiple motivational techniques such as incentives 57, education 58 and social networking 59. In an exemplary embodiment, the multiple motivational techniques and multiple motivational theories may include several other motivational theories and techniques.

Firstly, the motivational theory suitable for the client 16 may be identified based on the initial motivational profile 19 and the classified current state 49. Further, each of the multiple motivational techniques are rated either high, medium or low with respect to the motivational theories in the X space model 56. The motivational technique rated high with respect to the suitable motivational technique identified for the client 16 may be considered as the first optimal motivational technique 15 for the client 16. In a non-limiting example the first optimal motivational technique 15 may include at least one of incentives or loyalty points, pre/post enrollment content, education, social networking, financial benefits and gaming.

For example, in one instance of the X space model 56, the cognitive theory 51 may be identified by the self-learning component 54 to motivate the client 16 based on the initial motivational profile 19 of the client 16. The cognitive theory 51 may include any motivational technique that may appeal to the intellect of the client 16. In the illustrated embodiment, an educational technique 58 in the X space model 56 is rated high at a region 61 as the educational technique may appeal to the intellect of the client 16. However, the educational technique 58 may not have an immediate monetary gain and may not appeal to a client for whom, the self learning component may have identified the monetary theory 53. Therefore, the educational technique 58 may be rated low at a region 63 on the monetary theory 53. Similarly, the multiple motivational theories and the multiple motivational techniques may be plotted in the X space model.

Again referring to FIG. 3, the client state motivational component 50 generates the first optimal motivational response 21 based on the first optimal motivational technique 15 provided by the self-learning component 54. The client state motivational component 50 transmits the first optimal motivational response 21 to the output device 22 for displaying it to the client 16 and to the self-learning component 54 for storing the first optimal motivational response 21. Furthermore, the self-learning component 54 receives a second classified current state 66 for the second measured current state 46. In one embodiment, the second classified current state 66 is subsequent to the classified current state 49 described above. The self learning component 54 analyzes the first optimal motivational response 21 and the second classified state 66 of the second measured current state 46 to determine the frequency of notification, the content formats based on the client interest area provided within the initial motivational profile information 19. The self-learning component 54 automatically generates the second motivational response 68 of the desired content format and provides the second optimal motivational response 68 to the client 16 at the desired frequency. The process described above in FIG. 1 to FIG. 5 may be repeated continuously until the client 16 achieves a desired goal. Alternatively, in a service subscription model, the process may be repeated until a subscription to receive motivational responses expires. Some additional examples of first optimal motivational response 21 and the second optimal motivational response based on the first optimal motivational technique 15 and the second optimal motivational technique are provided below.

For example, the first optimal motivational technique 15 including incentives may be either one time such as registration, or based on loyalty points for regular interaction with the system. The first optimal motivational response 21 may include merchandise or coupons for merchandise, theme park & vacation coupons, movie tickets, preview access to certain content, pledges from friends & relatives, raffle entries and prizes from sponsors.

For example, the first optimal motivational technique 15 including pre/post enrollment content may include first optimal motivational response 21 such as introductions by celebrities, athletes or other inspirational people, post-roll bonus/limited access material to educational content that may be statistically seldom viewed and pairing educational content with loosely relevant entertainment content.

In another example, the first optimal motivational technique 15 including education may include the first optimal motivational response 21 such as educational information about the demerits of the current state of the client 16 or any new information regarding the current state.

In a further example, the first optimal motivational technique 15 including social networking may include the first optimal motivational response 21 such as responses from friends and family to encourage the client 16, connecting the client 16 to online forums to connect with people having common concerns and coaching by experts and mentors.

In yet another example, the first optimal motivational technique 15 including gaming may be employed to provide motivation to the client 16 having health problems such as a patient. The first optimal motivational response 21 may include providing a character representative of the client 16 in a virtual world where the client may be motivated to drive that character to achieve its goal, gaming points, providing strength to the character based on the physiological data provided by the patient and online community portals for health challenges such as portals for weight loss.

EXAMPLES

FIGS. 6-8 further illustrate the previously described diabetes control example. FIG. 6 is a graphical representation 70 of a blood sugar level in a human body depicting a first current state and a second current state of the blood glucose level for the client to generate a second measured current state in accordance with an embodiment of the invention. The X axis 72 represents one instance of blood glucose level diagnosis. The Y axis 74 represents the blood glucose level in milligrams per deciliter. The curve 76 represents a normal blood glucose level. The curve 78 represents a minimum blood glucose level. The curve 80 represents a maximum blood glucose level. The point 82 depicts the first current state of the blood glucose level. The point 84 represents the second current state of the blood glucose level. The curve 86 depicts the transition of the client (patient) from the first current state to the second current state. As illustrated, the client has a blood glucose level higher than the normal blood glucose level and may be assigned a negative value by the client state measuring component. The client state measuring component may assign a value of "−0.2" to the second measured current state as there may be an increase of 20 percent in the blood glucose level relative to the first measured current state.

FIG. 7 is a graphical representation 90 of a glycated hemoglobin level in the blood of a human body depicting a first and a second current state of the glycated hemoglobin level for the client to generate the second measured current state in accordance with an embodiment of the invention. The X axis 92 represents one instance of glycated hemoglobin diagnosis. The Y axis 94 represents the glycated hemoglobin level in percentage present in the blood. The curve 96 represents a normal glycated hemoglobin level. The curve 98 represents a minimum glycated hemoglobin level. The curve 100 represents a maximum glycated hemoglobin level. The point 102 depicts the first current state of the glycated hemoglobin level. The point 104 represents the second current state of the glycated hemoglobin level. The curve 106 depicts the transition of the client (patient) from the first current state to the second current state. As observed, the glycated hemoglobin level has exceeded the maximum level and may be assigned a negative value by the client state measuring component. The client state measuring component may assign a value of "−0.8" based on the transition curve 106.

FIG. 8 is a graphical representation 110 of an exercise activity for a diabetes patient depicting a first and a second current state of the exercise activity for the client to generate the second measured current state in accordance with an embodiment of the invention. The X axis 112 represents the number of days. The Y axis 114 represents the minutes for the exercise activity. The curve 116 represents a normal exercise activity in minutes per day. The curve 118 represents a minimum exercise activity in minutes per day. The curve 120 represents a maximum exercise activity in minutes per day. The point 122 depicts the first current state of the exercise activity. The point 124 represents the second current state of the exercise activity. The curve 126 depicts the transition of the client (patient) from the first current state to the second current state. As observed, the exercise activity has reduced to a minimum level and may be assigned a negative value by the client state measuring component. The client state measuring component may assign a value of "−0.1" as the transition curve 126 depicts a ten percent decrease in the minutes of activity from the normal minutes of exercise activity.

The client state measuring component may aggregate the proxy parameters by multiplying the values of the proxy parameters in the second current state with the predefined weighing factors of the corresponding proxy parameter. For example, the predefined weighing factors for the blood glucose level, the glycated hemoglobin and exercise activity are 0.9, 1.0 and 0.5 respectively disclosed with reference to FIG. 6-8. A sum of the product of the proxy parameters and the corresponding weighing factors may yield an output of "−1.03". The output may be normalized to generate the second measured current state of "−2.06". The second measured current state generated by the client state measuring component may be transmitted to the client state classification component. The client state classification component compares the second measured current state with threshold values representative of the predefined classes. The client state classification component may classify the second measured current state of "−2.06" in the "off plan" predefined class. The "off plan" predefined class may be represented in the Y response matrix and analyzed with respect to a motivational effectiveness of the first motivational response by the self learning component. The self learning component analyzes the Y response matrix based on the X space model to identify a second motivational technique to motivate the client to transition from the "off plan" predefined class to "on plan" predefined class. The client state motivational component generates a second motivational response based on the second motivational technique.

In a further non-limiting example, the system 10 may be employed to motivate a client 16 to achieve a goal of weight reduction. The example is better understood with reference to FIGS. 9-11.

FIG. 9 is a graphical illustration 130 of a predefined set of proxy parameters depicting an idealized weight loss model in accordance with an embodiment of the invention. The X axis 132 represents weight in pounds. The Y axis 134 represents weight loss per week in pounds per week. The curve 136 represents a weight loss plan for a person in pounds per week. The curve 138 represents a maximum weight loss per week in the weight loss plan for the person in pounds per week in the ideal weight loss model. The curve 140 represents a minimum weight loss per week in the weight loss plan for the person in pounds per week in the ideal weight loss model. As discussed above, the processor includes the predefined set of proxy parameters for providing a predefined state.

FIG. 10 is a graphical illustration 150 of a predefined state depicting a personalized weight loss plan to reach a goal of 170 pounds generated by the processor after analyzing the idealized weight loss model of FIG. 9 and the at least one input provided by the client in accordance with an embodiment of the invention. The X axis 152 represents a number of weeks. The Y axis 154 represents the weight in pounds. The curve 156 represents the weight loss per week in pounds. The curve 158 represents a minimum weight loss per week in the personalized weight loss plan for the person in pounds per week. The curve 160 represents a maximum weight loss per week in the personalized weight loss plan for the person in pounds per week. As depicted, the processor generates a personalized weight loss plan for the client based on the predefined set of proxy parameters such as idealized weight loss model and the at least one input provided by the client. The personalized weight loss plan may be representative of the predefined current state of the client.

FIG. 11 is a graphical representation 170 of client progress on the personalized weight loss plan of FIG. 10. FIG. 11 depicts multiple current states and multiple motivational responses generated based on the multiple current states in accordance with an embodiment of the invention. The X axis 172 represents a number of weeks. The Y axis 174 represents the weight in pounds. The curve 176 represents the weight loss per week in pounds. The curve 178 represents a minimum weight loss per weak in the personalized weight loss plan for the person in pounds per week. The curve 180 represents a maximum weight loss per week in the personalized weight loss plan for the person in pounds per week. The curve 182 represents the progress of the client on the personalized weight loss plan. As illustrated, the progress curve 182 includes a point 184 overlapping the minimum weight loss curve 178. The point 184 depicts a first measured current state representative of an "off plan" predefined class. The client state motivational component generates a first motivational response at the point 184 and transmits the first motivational response to the client. In one embodiment, the first motivational response may be a negative motivational response motivating the client to adhere to the weight loss plan. In a non limiting example, the negative motivational response may include educational information describing demerits of obesity. Similarly, a second motivational response may be generated at point 186 on the progress curve. The second motivational response may include a positive motivational response such as encouragement from friends and family via social networking.

FIG. 12 is a flow chart representing the steps involved in the method 200 for providing an optimal motivational response to a client in accordance with an embodiment of the invention. The method 200 begins with client input that is received from the client via an input device in step 202. In one embodiment, a predefined state, values for a set of proxy parameters based on the predefined state and initial motivational profile information may be received from the client.

Subsequent to step 202, the client input may be analyzed and a current state of the client may be generated based on the client input via a processor in step 204. The current state may be generated based on predefined conditions as discussed in FIG. 3 above.

Subsequently, the current state of the client may be analyzed and an optimal motivational technique may be determined for the client based on the current state of the client via a processor in step 206. The values of each of the proxy parameters are aggregated to measure the current state. In one embodiment, the values of each of the proxy parameters are multiplied with a predefined weighing factor of each of the corresponding proxy parameter in the set of proxy parameters. A first measured current state and a second measured current state are classified representative of a predefined class. In a particular embodiment, the first measured current state and the second measured current state are classified in a first, a second and a third predefined class. A first classified state may be analyzed to identify the optimal motivational technique to motivate the client. In an exemplary embodiment, identifying the optimal motivational technique includes determining a first and a second optimal motivational technique.

Subsequently, in step 208, an optimal motivational response may be generated based on the optimal motivational technique. In one embodiment, a first and a second motivational response are generated based on a first and a second motivational technique. The second optimal motivational technique may be automatically generated based on the first motivational response and the second measured current state. In a particular embodiment, the first optimal motivational response may be stored in a self learning component to automatically generate the second motivational response. In an exemplary embodiment, an expectancy of transition of the current state of the client from one predefined class to a second predefined class may be evaluated. Further, in step 210, the optimal motivational response may be displayed to the client via an output device.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for providing an optimal motivational response comprising:
   an input device configured to receive at least one client input from the client;
   a processor configured to:
      analyze the at least one client input received from the client and generate a current state of the client based on the at least one client input;
      analyze the current state of the client and determine an optimal motivational technique for the client based on the current state of the client and the at least one client input; and
      generate an optimal motivational response based on the optimal motivational technique,
   an output device configured to display the optimal motivational response to the client.

2. The system of claim 1, wherein the at least one client input comprises a predefined state, values for a set of proxy parameters based on the predefined state and an initial motivational profile information.

3. The system of claim 1, wherein the optimal motivational technique comprises at least one of an incentive, social networking and gaming technique.

4. The system of claim 1, wherein the processor comprises a motivational engine configured to analyze the current state of the client and determine the optimal motivational technique for the client based on the current state of the client and the at least one client input.

5. The system of claim 4, wherein the motivational engine comprises a plurality of motivational filters.

6. The system of claim 5, wherein the plurality of motivational filters comprises a notification frequency, a content format and a client interest area.

7. The system of claim 4, wherein the motivational engine comprises a client state measuring component configured to measure a first current state of the client and a second current state of the client.

8. The system of claim 7, wherein the client state measuring component comprises a plurality of predefined weighing factors for each of the proxy parameters in the set of proxy parameters.

9. The system of claim 4, wherein the motivational engine comprises a client state classification component configured to classify a first measured current state and a second measured current state representative of a predefined class.

10. The system of claim 9, wherein the predefined class comprises a first, a second and a third predefined class.

11. The system of claim 10, wherein the first predefined class comprises the first measured current state and the second measured current state representative of a first predefined threshold range.

12. The system of claim 10, wherein the second predefined class comprises the first measured current state and the second measured current state representative of a second predefined threshold range.

13. The system of claim 10, wherein the third predefined class comprises the first measured current state and the second measured current state representative of a third predefined threshold range.

14. The system of claim 4, wherein the motivational engine comprises a client state motivational component configured to identify the optimal motivational technique to motivate the client based on the first measured current state and generate a first motivational response corresponding to the optimal motivational technique.

15. The system of claim 14, wherein the client state motivational component comprises a self learning component configured to automatically generate a second optimal motivational technique for the client based on the first motivational response and the second measured current state.

16. A method for providing an optimal motivational response to a client comprising:
   receiving at least one client input from the client via an input device;
   analyzing the at least one client input received from the client and generating a current state of the client based on the at least one client input via a processor;
   analyzing the current state of the client via the processor and determining an optimal motivational technique for the client based on the current state of the client and the at least one client input via the processor;

generating an optimal motivational response based on the optimal motivational technique via the processor; and displaying the optimal motivational response to the client via an output device.

17. The method of claim 16, wherein receiving at least one client input from the client comprises receiving a predefined state, values for a set of proxy parameters based on the predefined state and an initial motivational profile information.

18. The method of claim 16, wherein analyzing the at least one client input comprises aggregating the values of the set of proxy parameters to measure a first current state of the client via a client state measuring component.

19. The method of claim 18, wherein aggregating the values of the set of proxy parameters comprises multiplying the values of each of the proxy parameters with a predefined weighing factor of each of the corresponding proxy parameter in the set of proxy parameters via the client state measuring component.

20. The method of claim 16, wherein analyzing the current state of the client comprises classifying a first measured current state and a second measured current state representative of a predefined class.

21. The method of claim 20, wherein classifying the first measured current state and the second measured current state comprises classifying the first measured current state and the second measured current state in a first, a second and a third predefined class.

22. The method of claim 16, wherein analyzing the current state of the client comprises identifying the optimal motivational technique to motivate the client based on a first measured current state via a client state motivational component.

23. The method of claim 22, wherein identifying the optimal motivational technique comprises determining a first and a second optimal motivational technique.

24. The method of claim 16, wherein generating the optimal motivational response comprises generating a first and a second motivational response.

25. The method of claim 24, wherein generating the optimal motivational response comprises generating the first motivational response and the second motivational response corresponding to the first and the second optimal motivational technique.

26. The method of claim 16, further comprising automatically generating the second optimal motivational technique for the client based on the first motivational response and the second measured current state.

27. The method of claim 26, wherein automatically generating the second optimal motivational technique for the client comprises storing the first motivational response in a self learning component.

28. The method claim 26, wherein automatically generating the second optimal motivational technique for the client comprises evaluating an expectancy of the current state of the client to transition from one predefined class to a second predefined class.

29. A non-transitory computer readable medium comprising one or more tangible media, wherein the one or more tangible media comprise code which when executed by one or more processors causes the one or more processors to:

receive at least one client input from the client;

analyze the at least one client input received from the client and generate a current state of the client based on the at least one client input;

analyze the current state of the client via the processor and determining an optimal motivational technique for the client based on the current state of the client and the at least one client input;

generate an optimal motivational response based on the optimal motivational technique; and display the optimal motivational response to the client.

\* \* \* \* \*

UNITED STATES PATENT AND TRADEMARK OFFICE
CERTIFICATE OF CORRECTION

PATENT NO. : 8,346,858 B2  
APPLICATION NO. : 12/974597  
DATED : January 1, 2013  
INVENTOR(S) : Cleary et al.

Page 1 of 1

It is certified that error appears in the above-identified patent and that said Letters Patent is hereby corrected as shown below:

In Fig. 3, Sheet 2 of 7, for Tag "26", in Line 1, delete "measureing" and insert -- measuring --, therefor.

In Fig. 5, Sheet 3 of 7, for Tag "59", in Line 1, delete "Socal" and insert -- Social --, therefor.

In Column 2, Line 28, delete "is" and insert -- is a --, therefor.

In Column 11, Line 49, delete "FIG." and insert -- FIGS. --, therefor.

In Column 12, Line 47, delete "weak" and insert -- week --, therefor.

In Column 16, Line 14, in Claim 28, delete "method" and insert -- method of --, therefor.

Signed and Sealed this  
Twenty-sixth Day of February, 2013

Teresa Stanek Rea  
*Acting Director of the United States Patent and Trademark Office*